(12) United States Patent
Schirtzinger

(10) Patent No.: US 8,578,716 B2
(45) Date of Patent: Nov. 12, 2013

(54) VALVE SYSTEM FOR A GAS TURBINE ENGINE

(75) Inventor: Gary A. Schirtzinger, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 744 days.

(21) Appl. No.: 12/871,024

(22) Filed: Aug. 30, 2010

(65) Prior Publication Data
US 2010/0326046 A1    Dec. 30, 2010

Related U.S. Application Data

(63) Continuation-in-part of application No. 12/061,021, filed on Apr. 2, 2008, now Pat. No. 8,286,416, and a continuation-in-part of application No. 12/053,595, filed on Mar. 22, 2008, now Pat. No. 8,240,126, and a continuation-in-part of application No. 12/053,591, filed on Mar. 22, 2008, now Pat. No. 8,402,744.

(51) Int. Cl.
*F02K 1/00* (2006.01)
*B63H 25/46* (2006.01)

(52) U.S. Cl.
USPC .................... 60/772; 60/231; 239/265.17

(58) Field of Classification Search
USPC ......... 60/39.23, 226.1, 226.3, 231, 262, 267, 60/782, 785; 239/123.3, 127.1, 265.17, 239/265.19; 251/209
See application file for complete search history.

(56) References Cited

U.S. PATENT DOCUMENTS

| | | | |
|---|---|---|---|
| 1,094,383 A | 4/1914 | Alexander |
| 1,624,512 A | 4/1927 | Shipley |
| 1,805,668 A | 5/1931 | Kelley |
| 2,604,446 A | 7/1952 | Palmer |
| 3,108,779 A | 10/1963 | Anderson |
| 3,177,887 A | 4/1965 | Priese |
| 3,632,221 A | 1/1972 | Uehling |
| 3,799,451 A | 3/1974 | Kollmai |
| 3,901,262 A | 8/1975 | Gutkowski |
| 3,929,151 A | 12/1975 | Rubin |
| 4,250,910 A | 2/1981 | King |
| 4,345,738 A | 8/1982 | Ripert |
| 4,478,182 A | 10/1984 | Nakanishi et al. |
| 4,531,537 A | 7/1985 | Smith |
| 4,548,227 A | 10/1985 | Regunathan et al. |
| 4,570,668 A | 2/1986 | Burke et al. |
| 4,662,387 A | 5/1987 | King, Sr. |
| 4,674,951 A | 6/1987 | Jourdain et al. |

(Continued)

FOREIGN PATENT DOCUMENTS

DE    1115087    10/1961

OTHER PUBLICATIONS

The Advent of a Better Jet Engine?, http://www.defenseindustrydaily.com/the-advent-of-a-better-jet-engine03623.

*Primary Examiner* — Ehud Gartenberg
*Assistant Examiner* — Arun Goyal
(74) *Attorney, Agent, or Firm* — Carlson, Gaskey & Olds, P.C.

(57) ABSTRACT

A valve system intermediate a secondary flow path and a primary flow path to selectively communicate secondary airflow into the primary gas flow path and control airflow injected from a higher pressure plenum into a lower pressure flowpath.

10 Claims, 4 Drawing Sheets

(56) References Cited

U.S. PATENT DOCUMENTS

| | | | |
|---|---|---|---|
| 4,679,982 A | 7/1987 | Bouiller et al. | |
| 4,711,084 A | 12/1987 | Brockett | |
| 4,854,127 A | 8/1989 | Vinson et al. | |
| 4,970,932 A | 11/1990 | Hamanaga | |
| 5,012,639 A | 5/1991 | Ream et al. | |
| 5,074,522 A | 12/1991 | Reynolds et al. | |
| 5,123,240 A | 6/1992 | Frost et al. | |
| 5,127,222 A | 7/1992 | Ream et al. | |
| 5,184,461 A * | 2/1993 | Stransky et al. | 60/226.3 |
| 5,211,007 A | 5/1993 | Marvin | |
| 5,307,624 A | 5/1994 | Even-Nur et al. | |
| 5,312,086 A | 5/1994 | Hollingworth | |
| 5,531,566 A * | 7/1996 | Derouet et al. | 415/145 |
| 5,727,771 A | 3/1998 | Chang-Hong | |
| 5,867,980 A | 2/1999 | Bartos | |
| 6,301,877 B1 * | 10/2001 | Liang et al. | 60/226.1 |
| 6,385,959 B1 | 5/2002 | Montoya | |
| 6,471,475 B1 | 10/2002 | Sasu et al. | |
| 6,622,475 B2 | 9/2003 | Brault et al. | |
| 6,679,048 B1 | 1/2004 | Lee et al. | |
| 6,694,723 B2 | 2/2004 | Ward | |
| 6,701,715 B2 | 3/2004 | Anderson et al. | |
| 6,802,691 B2 | 10/2004 | Chlus | |
| 6,877,306 B2 | 4/2005 | Wernberg et al. | |
| 6,895,756 B2 | 5/2005 | Schmotolocha et al. | |
| 6,907,724 B2 | 6/2005 | Edelman et al. | |
| 6,997,676 B2 | 2/2006 | Koshoffer | |
| 7,028,484 B2 | 4/2006 | Prociw et al. | |
| 7,032,835 B2 | 4/2006 | Murphy et al. | |
| 7,055,303 B2 | 6/2006 | Macfarlane et al. | |
| 7,093,442 B2 | 8/2006 | Lovett | |
| 7,114,519 B2 | 10/2006 | Aitchison et al. | |
| 7,174,704 B2 | 2/2007 | Renggli | |
| 7,189,055 B2 | 3/2007 | Marini et al. | |
| 7,213,547 B2 | 5/2007 | Peliks et al. | |
| 7,225,623 B2 | 6/2007 | Koshoffer | |
| 7,244,104 B2 | 7/2007 | Girgis et al. | |
| 2003/0126853 A1 | 7/2003 | Koshoffer et al. | |
| 2003/0217552 A1 | 11/2003 | Calabro | |
| 2004/0006969 A1 | 1/2004 | Whurr | |
| 2004/0187474 A1 | 9/2004 | Martens et al. | |
| 2004/0216444 A1 | 11/2004 | Lovett | |
| 2005/0081509 A1 | 4/2005 | Johnson | |
| 2005/0091982 A1 | 5/2005 | Renggli et al. | |
| 2005/0172611 A1 | 8/2005 | Blodgett | |

* cited by examiner

VALVE SYSTEM FOR A GAS TURBINE ENGINE

REFERENCE TO RELATED APPLICATIONS

The present invention is a continuation-in-part of U.S. patent application Ser. No. 12/061,021, filed Apr. 2, 2008 now U.S. Pat. No. 8,286,416; U.S. patent application Ser. No. 12/053,595, filed Mar. 22, 2008 now U.S. Pat. No. 8,240,126; and U.S. patent application Ser. No. 12/053,591, filed Mar. 22, 2008 now U.S. Pat. No. 8,402,744.

BACKGROUND

The present invention relates to a gas turbine engine, and more particularly to a valve system for operation therewith.

A gas turbine engine, such as a turbofan engine for an aircraft, includes a fan section, a compression section, a combustion section, and a turbine section. An engine centerline extends longitudinally through these sections. A primary flow path extends axially through the engine. An annular secondary flow path is generally located radially outward of the primary flow path.

Cooling air along the secondary flow path is often communicated to the primary flow path during particular operating conditions. In order to assure efficient engine operation and performance, communication of the cooling air from the secondary flow path to the primary flow path may be meticulously rationed.

SUMMARY

A valve system according to an exemplary aspect of the present disclosure located intermediate a secondary flow path and a primary exhaust flow path. The valve system includes a valve member rotatable relative a valve seat between an open position and a closed position, the valve member defines a cylindrical surface which defines the closed position and a sculpted surface.

A gas turbine engine according to an exemplary aspect of the present disclosure includes an engine duct structure and an inner cooling liner structure which at least partially define a secondary flow path and a primary flow path along a longitudinal axis. A valve system includes a valve member rotatable relative to a valve seat between an open position and a closed position, the valve member defines a cylindrical surface which defines the closed position and a sculpted surface.

A method of a controlling communication of a secondary flow path with a primary flow path of a gas turbine engine according to an exemplary aspect of the present disclosure includes selectively rotating a valve member relative to a valve seat between an open position and a closed position, the valve member defines a cylindrical surface which defines said closed position and a sculpted surface which defines intermediate positions and said open position.

BRIEF DESCRIPTION OF THE DRAWINGS

The various features and advantages of this invention will become apparent to those skilled in the art from the following detailed description of the currently disclosed embodiment. The drawings that accompany the detailed description can be briefly described as follows.

DETAILED DESCRIPTION

Figure 1:
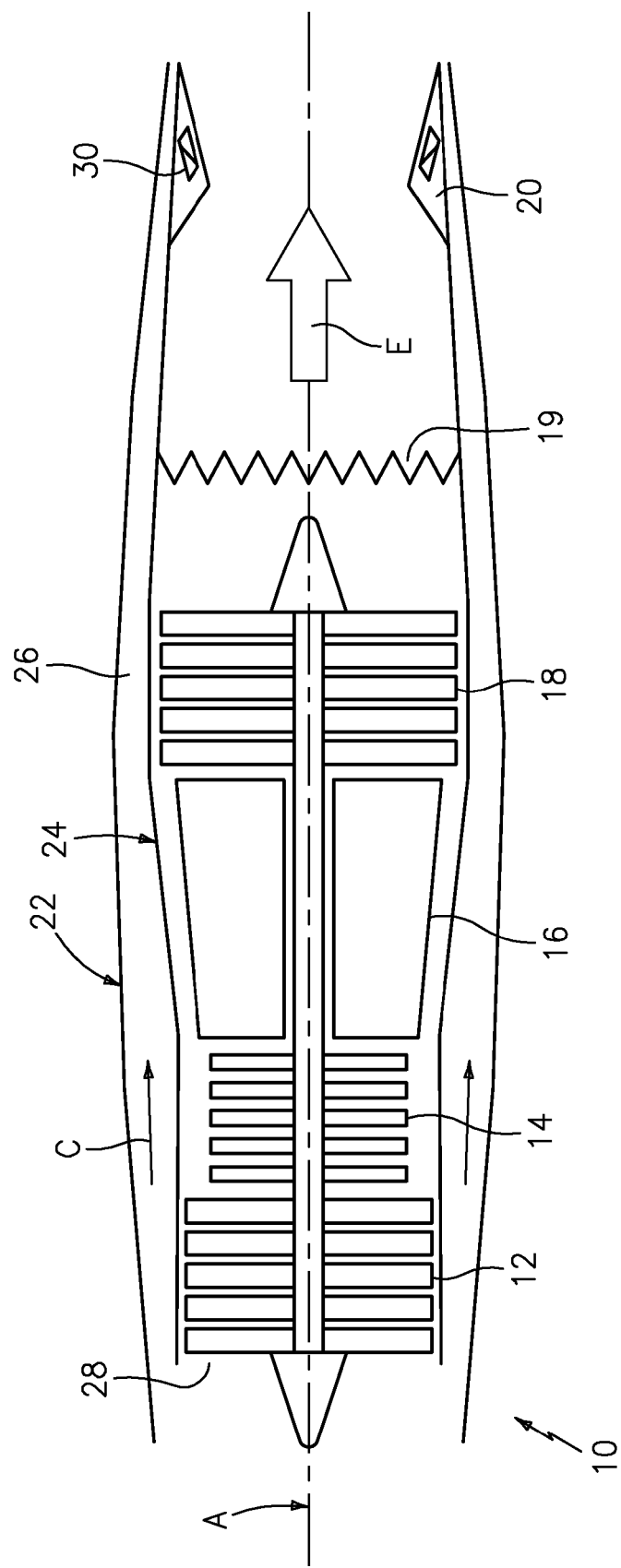
FIG. 1 is a general sectional view an exemplary gas turbine engine embodiment.

FIG. 1 schematically illustrates a gas turbine engine 10 which generally includes a fan section 12, a compressor section 14, a combustor section 16, a turbine section 18, an augmentor section 19, and a nozzle section 20. An engine axis A is centrally disposed through these sections. The compressor section 14, combustor section 16, and turbine section 18 are generally referred to as the core engine. In one non-limiting embodiment, the nozzle section 20 may be a 2D nozzle with vector or VTOL capabilities. It should be understood that although a low bypass gas turbine engine is schematically illustrated, other gas turbine engines will benefit from the disclosure.

An engine duct structure 22 and an inner cooling liner structure 24 define an annular secondary flow path 26 at least partially around a perimeter of a primary flow path 28 which directs a primary combustion core gas exhaust flow (illustrated schematically by arrow E). It should be understood that the engine duct structure 22 may also at least partially define various alternative and additional airflow paths other than the disclosed secondary flow path 26.

The secondary flow path 26 guides a secondary airflow C between the engine duct structure 22 and the inner cooling liner structure 24. The secondary airflow as defined herein may be any airflow different from the primary combustion core gas exhaust flow E such as Adaptive Versatile Engine Technology (ADVENT) cycle third stream fan flow which may be sourced from the fan section 12 and/or compressor section 14. The secondary airflow C is utilized for a multiple of purposes including, for example, cooling, pressurization, partial shielding and mixing with the core gas flow E in the nozzle section 20 during particular operational profiles.

A valve system 30 is located intermediate the secondary flow path 26 and the primary flow path 28 to selectively communicate secondary airflow C into the primary gas flow path E. A valve system 30 operates rapidly and repeatedly while configured to be received within minimal package space. For example only, under certain conditions, such as when an aircraft is hovering, less secondary airflow may be required in the nozzle section 20. By blocking or otherwise controlling or varying the secondary airflow thereto, additional secondary airflow then becomes available for other purposes. It should be understood that the valve system 30 may be utilized in any location and any environment to control airflow injected from a higher pressure plenum into a lower pressure flowpath such as, for example only, in the nozzle section.

Figure 2:
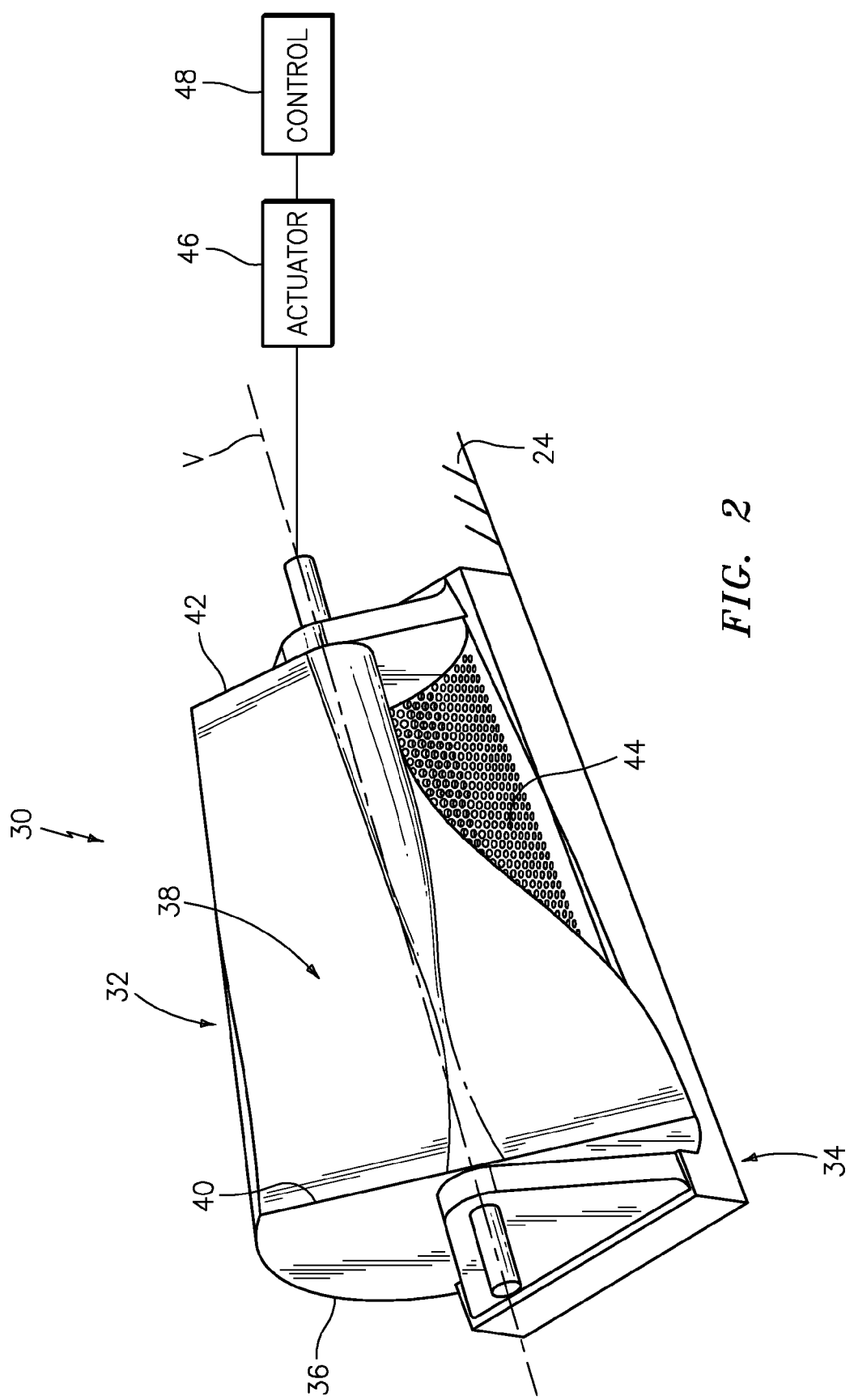
FIG. 2 is an expanded view of a valve system in an intermediate position for use with the gas turbine engine.
Figure 3:
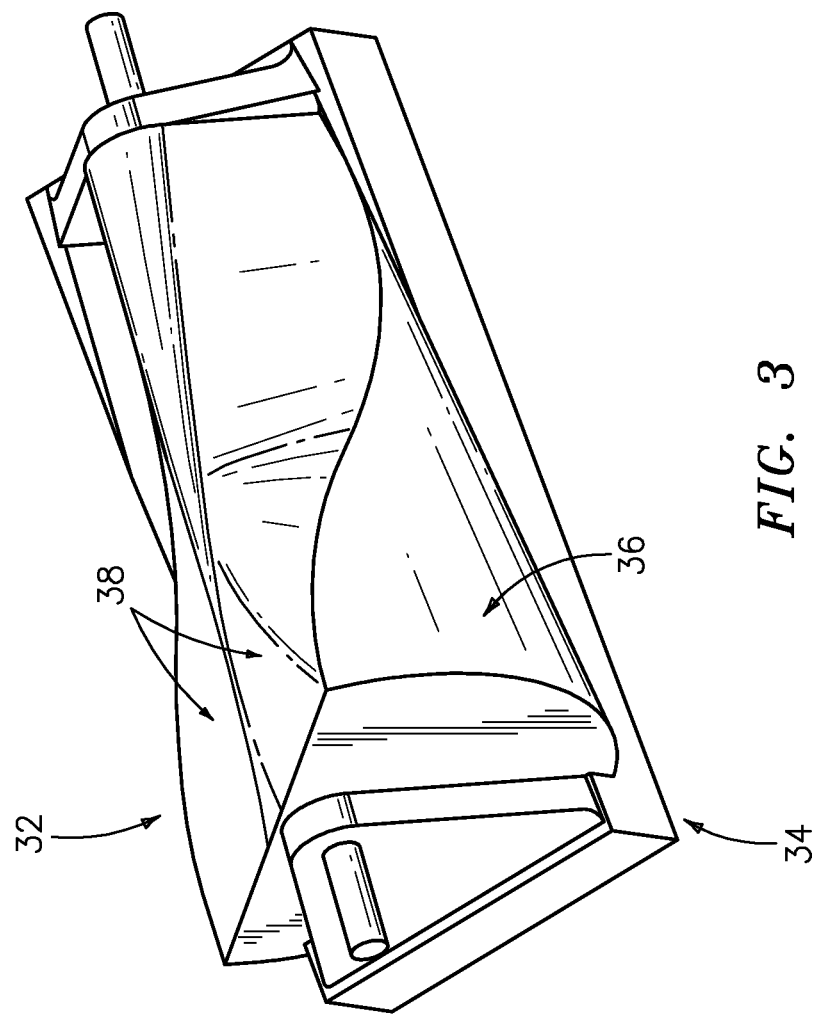
FIG. 3 is an expanded view of a valve system in a closed position for use with the gas turbine engine.
Figure 4:
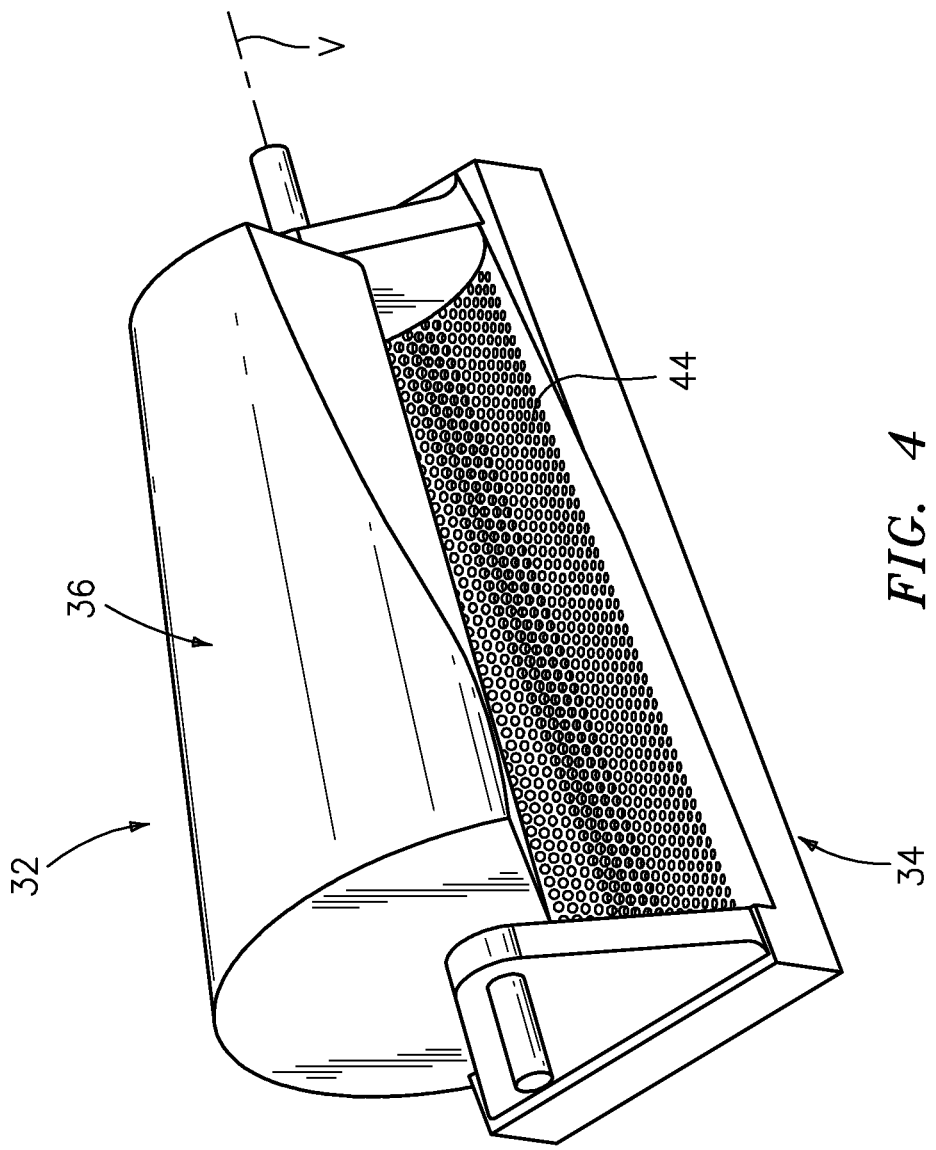
FIG. 4 is an expanded view of a valve system in an open position.

Referring to FIG. 2, the valve system 30 generally includes a valve member 32 which rotates about an axis of rotation V relative to a valve seat 34 for movement between a closed position (FIG. 3) and an open position (FIG. 4).

The valve 30 is shaped to minimize airflow blockage when closed and facilitate airflow direction when open. The valve 30 is shaped in the disclosed non-limiting embodiment to provide a generally cylindrical package to facilitate location within the engine structure at multiple circumferential positions.

The valve member 32 includes a cylindrical surface 36 and a sculpted surface 38 opposite the cylindrical surface 36. Although illustrated in the disclosed non-limiting embodiment as being solid, the valve member 32 may be hollow or otherwise shaped with spokes, etc to reduce weight and moment of inertia. The sculpted surface 38 may include, in one non-limiting embodiment, a paired wave surface which twists from a generally parallel surface 40 at one end of the valve member 32 to an angularly acute or perpendicular surface 42 at the opposite end of the valve member 32. That is, the sculpted surface 38 controls airflow while the cylindrical surface 36 provides for sealing.

The valve seat 34 may be mounted to a plenum wall such as the inner cooling liner structure 24 (FIG. 1) to provide for communication between the secondary flow path 26 and the primary flow path 28. The valve seat 34 at least partially surrounds a metering plate 44 which may further guide the airflow between the secondary flow path 26 and the primary flow path 28. The metering plate 44 may include a mesh, grid, hole or honeycomb structure which directs and smoothes the airflow therethrough as well as reduces noise generation.

An actuator system 46 having a hydraulic, pneumatic or electromagnetic actuator controls rotation of the valve member 32 relative the valve seat 34 through a control 48. It should be understood that various actuator systems and controls may be usable with the present invention.

In one non-limiting embodiment, the valve member 32 rotates relative the valve seat 34 between a 0 degree closed position (FIG. 3) and a 120 degree open position (FIG. 4). It should be understood that essentially infinite positions may be provided between the closed position (FIG. 3) and an open position (FIG. 4) to regulate airflow.

This valve system 30 facilitates the regulation of airflow across the metering plate 44 to distribute the flow over the length of the metering plate 44. That is, the regulation of airflow is readily transitioned from one end section to the other of the metering plate 44. The valve system 30 is compact yet provides a rotary motion for quick response times.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A valve system intermediate a secondary flow path and a primary flow path of a gas turbine engine comprising:

an engine core primary flow path;
a fan flow secondary flow path coaxial with said primary flow path;
a nozzle to elect said primary flow outside primary flow path;
a valve seat; and
a valve member rotatable relative to said valve seat between an open position and a closed position, said valve member defines a cylindrical surface which defines said closed position and a sculpted surface wherein said sculpted surface defines a paired wave surface which twists from a generally parallel surface at one end of said valve member to a generally perpendicular surface at the opposite end of said valve member.

2. The valve system as recited in claim 1, wherein said sculpted surface defines a wave shape.

3. The system as recited in claim 1, wherein said valve seat is mounted to an inner cooling liner structure of a gas turbine engine.

4. The system as recited in claim 1, further comprising an actuator system which operates said valve member.

5. The system as recited in claim 1, further comprising a metering plate defined by said valve seat.

6. A gas turbine engine comprising:

an engine duct structure and an inner cooling liner structure which at least partially define an engine core primary flow path and a fan flow secondary flow path coaxial with said primary flow path along a longitudinal axis;
a nozzle to elect said primary flow outside primary flow path;
a valve seat mounted to said inner cooling liner structure; and
a valve member rotatable relative said valve seat between an open position and a closed position, said valve member defines a cylindrical surface which defines said closed position and a sculpted surface wherein said sculpted surface defines a paired wave surface which twists from a generally parallel surface at one end of said valve member to a generally perpendicular surface at the opposite end of said valve member.

7. The engine as recited in claim 6, wherein said valve seat is flush with said inner cooling liner structure.

8. The engine as recited in claim 6, wherein said secondary flow path is defined radially about said primary flow path.

9. A method of a controlling communication of a fan flow secondary flow path with a coaxial engine core primary flow path said secondary flow path and said primary flow path located along a longitudinal axis of a gas turbine engine comprising the steps of:

selectively rotating a valve member relative to a valve seat between an open position and a closed position, the valve member defines a cylindrical surface which defines said closed position and a sculpted surface which defines intermediate positions and said open position wherein said sculpted surface defines a paired wave surface which twists from a generally parallel surface at one end of said valve member to a generally perpendicular surface at the opposite end of said valve member.

10. A method as recited in claim 9, wherein said selective rotation further comprises: opening the secondary flow path to primary flow path adjacent to a nozzle section.

* * * * *